United States Patent
Otake

(10) Patent No.: US 11,430,133 B2
(45) Date of Patent: Aug. 30, 2022

(54) VIDEO ANALYZING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Ritsuko Otake, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/889,002

(22) Filed: Jun. 1, 2020

(65) Prior Publication Data
US 2020/0388040 A1   Dec. 10, 2020

(30) Foreign Application Priority Data
Jun. 7, 2019 (JP) .............................. JP2019-107453

(51) Int. Cl.
*G06T 7/00* (2017.01)
*G06T 7/20* (2017.01)
*G06F 3/14* (2006.01)
*G06V 40/10* (2022.01)

(52) U.S. Cl.
CPC ................. *G06T 7/20* (2013.01); *G06F 3/14* (2013.01); *G06V 40/10* (2022.01); *G06T 2207/10016* (2013.01); *G06T 2207/30196* (2013.01); *G06T 2207/30242* (2013.01)

(58) Field of Classification Search
CPC ............. G06T 7/20; G06T 2207/10016; G06T 2207/30; G06T 2207/30196; G06T 2207/30242; G06F 3/14; G06K 9/00369; G06K 9/00778
See application file for complete search history.

(56) References Cited

U.S. PATENT DOCUMENTS

| | | | |
|---|---|---|---|
| 2012/0206597 A1* | 8/2012 | Komoto | G06T 7/215 348/135 |
| 2016/0133025 A1* | 5/2016 | Wang | G06K 9/00778 348/135 |
| 2019/0236377 A1 | 8/2019 | Otake | |

FOREIGN PATENT DOCUMENTS

| | | | | |
|---|---|---|---|---|
| JP | 2005092513 A | * | 4/2005 | |
| JP | 2010263581 A | | 11/2010 | |
| JP | 2018025914 A | | 2/2018 | |
| WO | WO-2017180698 A1 | * | 10/2017 | ............ H04W 4/026 |

* cited by examiner

Primary Examiner — Claire X Wang
Assistant Examiner — Denise G Alfonso
(74) Attorney, Agent, or Firm — Carter, DeLuca & Farrell LLP

(57) ABSTRACT

This invention provides a video analyzing apparatus which comprises an acquisition unit configured to acquire an image captured by an image capturing unit, a determining unit configured to determine a degree of congestion of persons in the image captured by the image capturing unit, and a deciding unit configured to decide a threshold to be used to determine a moving state of a person in the image based on the degree of congestion determined by the determining unit.

9 Claims, 11 Drawing Sheets

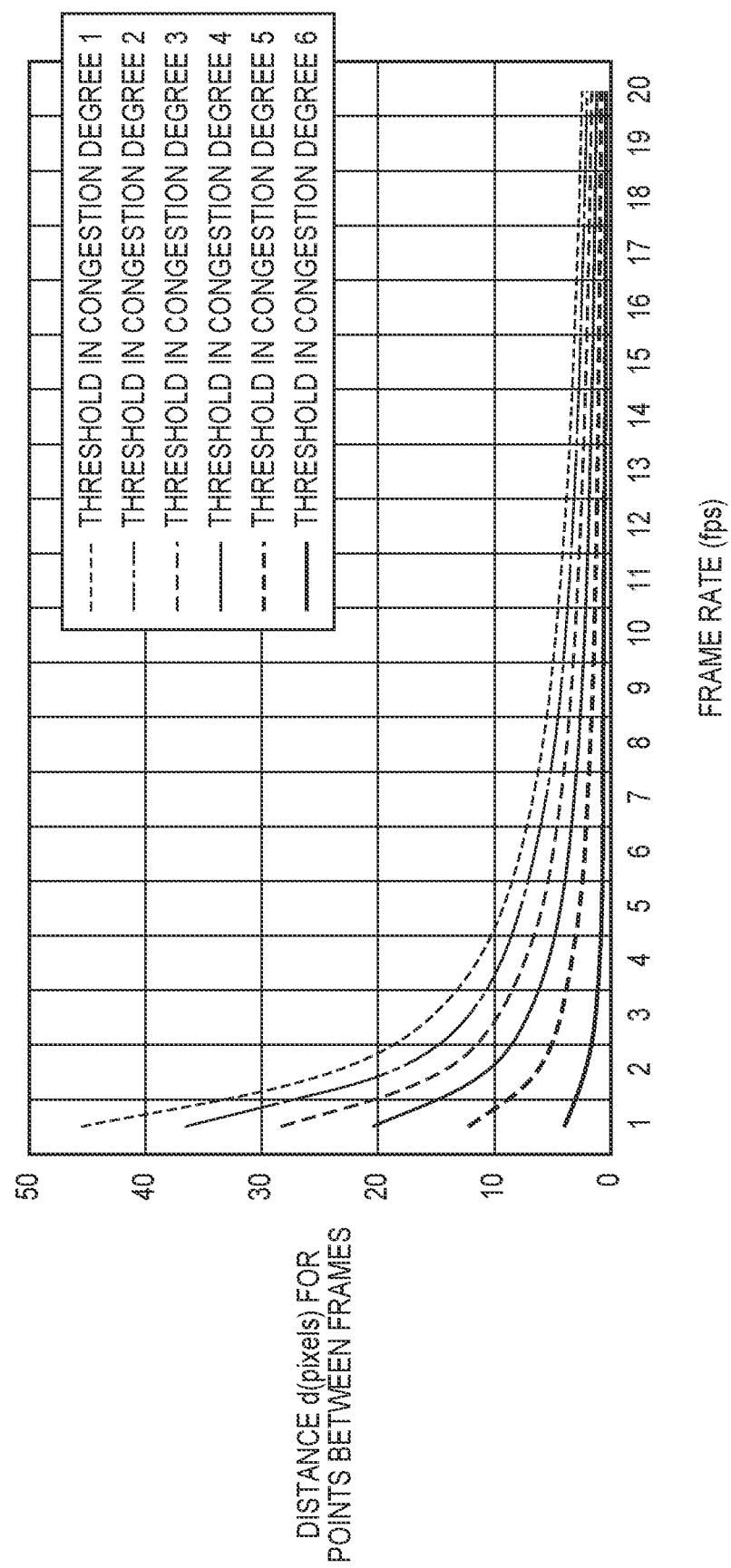

○ MOVEMENT
● STOP

○ MOVEMENT
● STOP

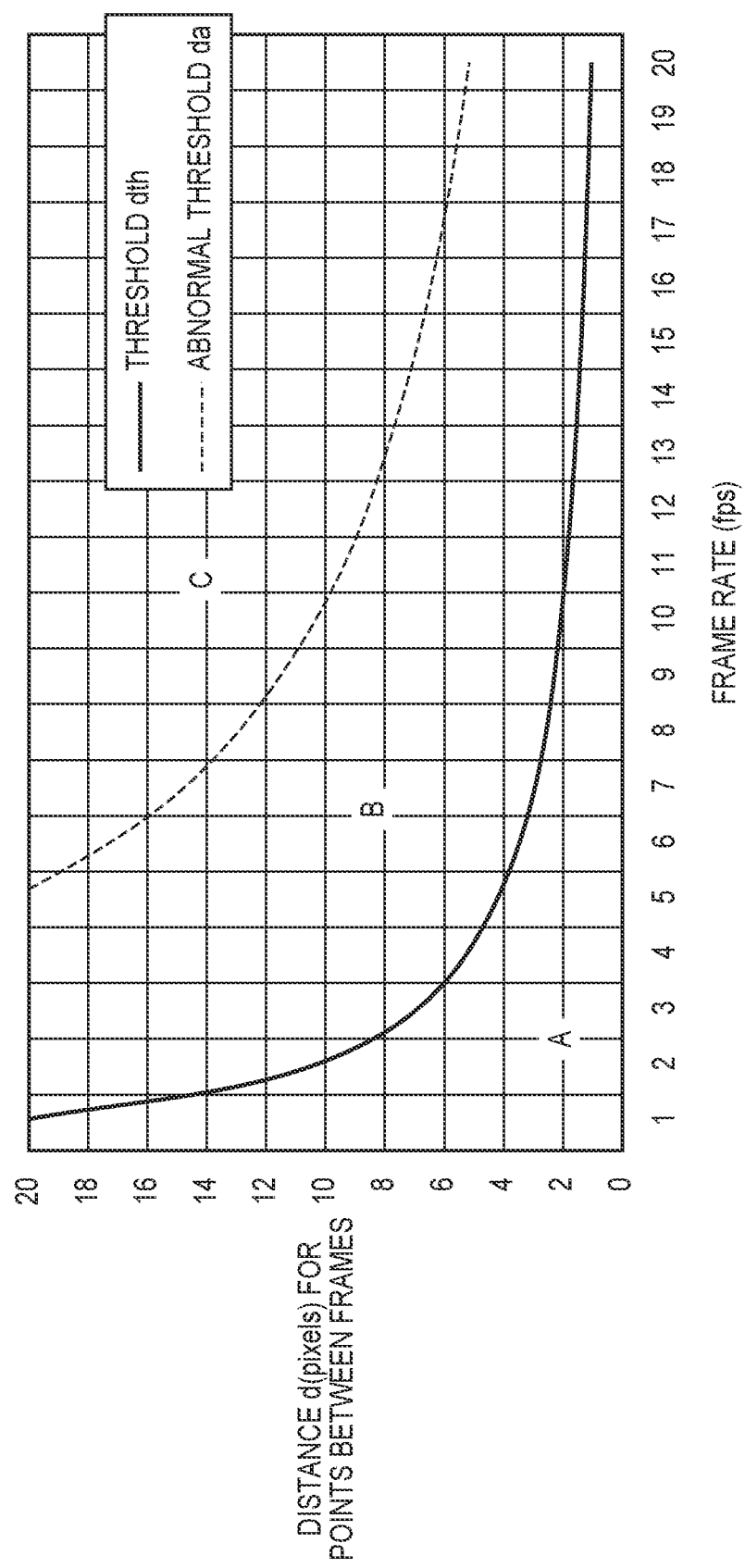

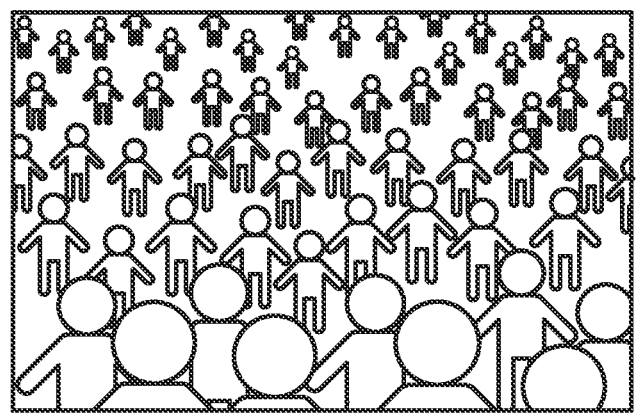
F I G. 8A
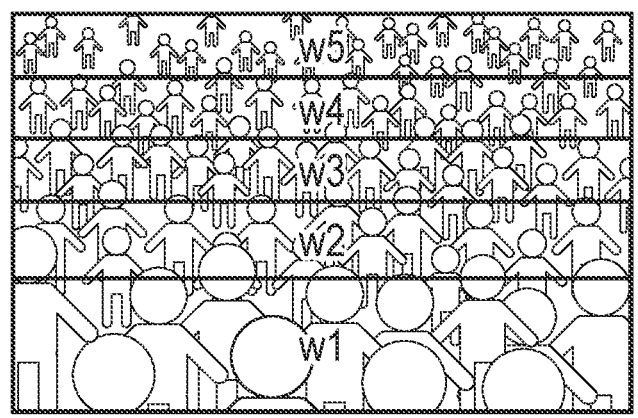
F I G. 8B
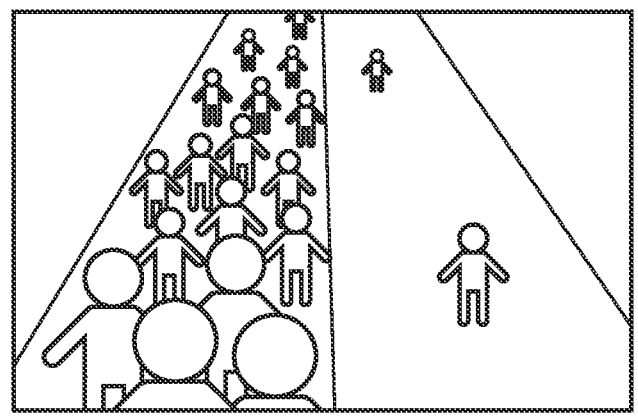
F I G. 9A
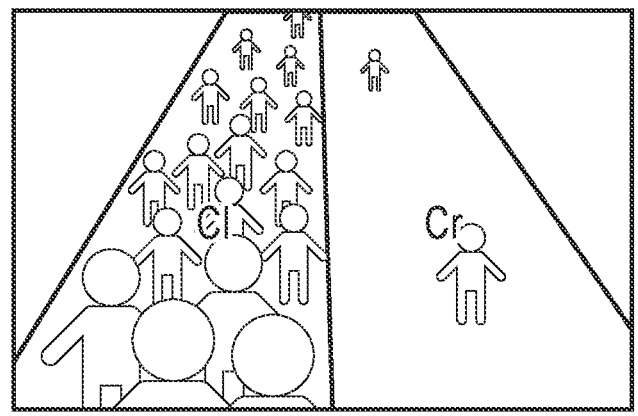
F I G. 9B

FIG. 11

| NUMBER OF PERSONS | CONGESTION-DEGREE |
|---|---|
| 1 ~ 5 | $C_0$ |
| 6 ~ 10 | $C_1$ |
| 11 ~ 20 | $C_2$ |
| 21 ~ | $C_3$ |

VIDEO ANALYZING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to a technique of determining a state concerning movement of a person in a video.

Description of the Related Art

When analyzing a video captured by a camera, image capturing suitable for the analysis processing is sometimes required. For example, Japanese Patent Laid-Open No. 2010-263581 discloses obtaining the minimum size and the moving speed of the face of a person in a video input by a camera, deciding the lower limit values of a resolution and a frame rate from the result, and performing camera settings suitable for analysis.

On the other hand, there is known a technique of performing analysis processing of recognizing an individual in a video and determining whether it is moving or at rest. For example, Japanese Patent Laid-Open No. 2018-25914 discloses acquiring a background image that has no temporal change in a video, recognizing an individual that is not included in the background image using difference images between the background image and a plurality of frame images, and determining a still state or an operation.

In some cases, the video as the target of video analysis is an already recorded video, and the camera settings cannot be changed to an optimum state. Even in a case in which the analysis target is a live video, or in a case in which a video is recorded in accordance with an analysis purpose, optimum camera settings cannot necessarily be done to cope with a network band or another analysis.

When acquiring a background image, obtaining difference images from a frame image of an analysis target and difference images between frames, and determining a still state or an operation of an individual, an opportunity of acquiring the background image needs to be reliably obtained, and it is sometimes difficult to obtain an expected result only from the video of the analysis target.

SUMMARY OF THE INVENTION

According to an aspect of the invention, there is provided a video analyzing apparatus comprising: an acquisition unit configured to acquire an image captured by an image capturing unit; a determining unit configured to determine a degree of congestion of persons in the image captured by the image capturing unit; and a deciding unit configured to decide a threshold to be used to determine a moving state of a person in the image based on the degree of congestion determined by the determining unit.

According to the present invention, it is possible to determine movement or stop of a person at a high accuracy in accordance with a place or environment where image capturing is performed.

Further features of the present invention will become apparent from the following description of exemplary embodiments (with reference to the attached drawings).

BRIEF DESCRIPTION OF THE DRAWINGS

FIG. 4 is a graph showing the relationship between a frame rate and a threshold for a congestion degree;

FIG. 6 is a graph showing the relationship of two types of thresholds with respect to a frame rate;

FIGS. 8A and 8B are views showing an example in which the sizes of captured persons are different in a screen;

FIGS. 9A and 9B are views showing an example in which regions of different congestion degrees exist in a screen;

FIG. 11 is a view showing an example of a table used to determine the congestion degree.

DESCRIPTION OF THE EMBODIMENTS

Figure 1:
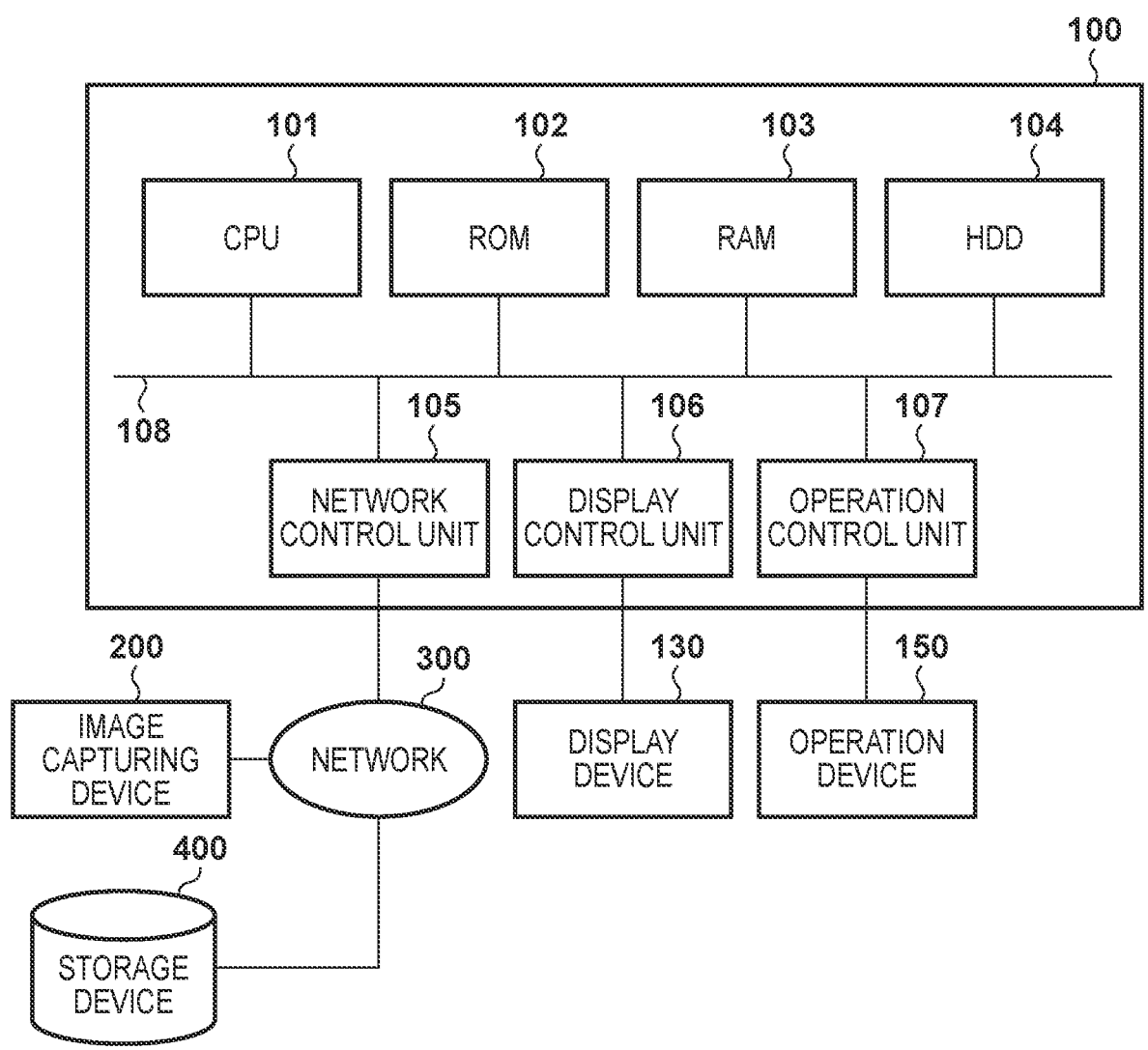
FIG. 1 is a block diagram showing a system arrangement according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a system arrangement applied in the first embodiment.

A video analyzing apparatus 100 includes a CPU 101, a ROM 102, a RAM 103, an HDD 104, a network control unit 105, a display control unit 106, and an operation control unit 107. These are connected to each other via a system bus 108 and can transmit/receive data. The video analyzing apparatus 100 is connected to a network 300 via the network control unit 105. As a result, the video analyzing apparatus 100 is communicably connected to an image capturing device 200 and a storage device 400 via the network 300. In addition, the video analyzing apparatus 100 is connected to a display device 130 via the display control unit 106. Further, the video analyzing apparatus 100 is connected to an operation device 150 via the operation control unit 107.

The CPU 101 comprehensively controls the operation of the video analyzing apparatus 100, and controls the components (102 to 107) via the system bus 108.

The ROM 102 is a nonvolatile memory that stores control programs and the like needed by the CPU 101 to execute processing. Note that the programs may be stored in the HDD 104 or in an external memory or a detachable storage medium (neither are shown).

The RAM 103 functions as the main memory, the work area, or the like of the CPU 101. That is, when executing processing, the CPU 101 loads a necessary program or the like from the ROM 102 into the RAM 103 and executes the program or the like thereby implementing various kinds of functional operations.

The HDD 104 is a storage device of a large capacity, and stores an OS (operating system), programs used by the CPU 101 to execute processing, and various kinds of data such as data to be used for analysis and analysis result data.

The network control unit 105 is an interface configured to communicate with external devices via the network 300. The external devices are the image capturing device 200 such as a network camera, the storage device 400 configured to accumulate recording data and other data, and other devices connected to the network.

The display control unit 106 is an interface configured to display, on the display device 130, display data output from the video analyzing apparatus 100.

The operation control unit 107 is an interface configured to transmit input information operation-instructed by a user via the operation device 150 to the video analyzing apparatus 100. The operation device 150 is, for example, a keyboard, a mouse, or a touch panel.

In the above-described arrangement, when the apparatus is powered on, the CPU 101 executes a boot program stored in the ROM 102, loads the OS from the HDD 104 into the RAM 103, and executes it. Under the control of the OS loaded into the RAM 103, the CPU 101 loads an application concerning image analysis from the HDD 104 into the RAM 103 and executes it, whereby the apparatus functions as an image analyzing apparatus.

Figure 10:
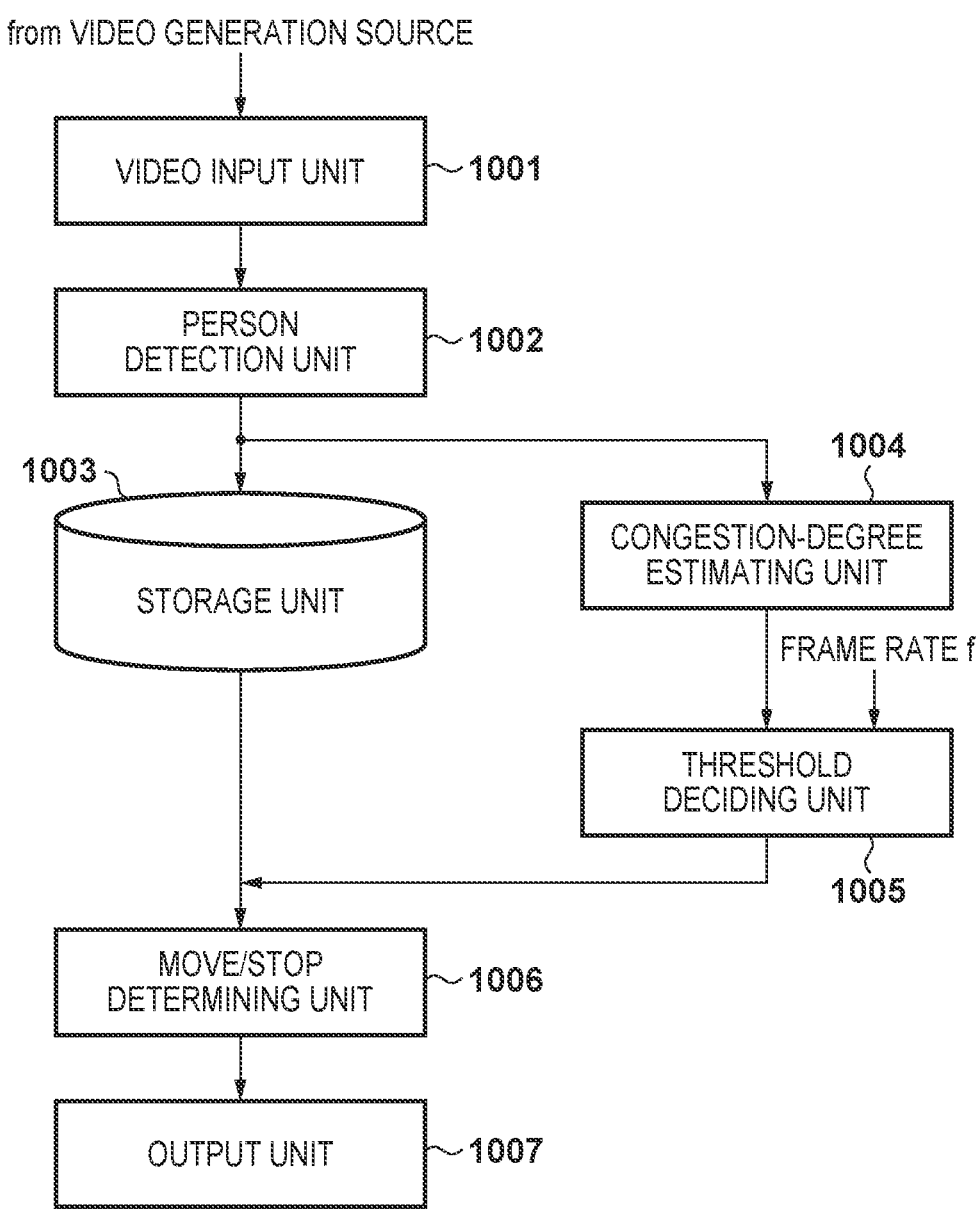
FIG. 10 is a functional block diagram of a video analyzing apparatus according to the embodiment.

FIG. 10 is a functional block diagram in a case in which the CPU 101 executes an image analysis application. It should be understood that a storage unit 1003 is implemented by the HDD 104 or the RAM 103, and remaining units denoted by reference numerals 1001, 1002, and 1004 to 1007 are implemented by the processing of the CPU 101.

The video input unit 1001 inputs video data from the image capturing device 200 on a frame basis. The person detection unit 1002 analyzes the input frame, performs person detection processing, and stores the coordinates of each detected person in the storage unit 1003. As a result, the coordinates of persons in the current and past frames can be held in the storage unit 1003. The congestion-degree estimating unit 1004 determines the number of persons based on the coordinates of persons output from the person detection unit, and estimates a congestion degree. Based on the congestion degree estimated by the congestion-degree estimating unit 1004 and the frame rate of the image capturing device, the threshold deciding unit 1005 decides a threshold for move/stop determination and supplies the threshold to the move/stop determining unit 1006. Based on the coordinates of the persons in the current frame and preceding frames, which are stored in the storage unit 1003, and the threshold supplied from the threshold deciding unit 1005, the move/stop determining unit 1006 determines whether each person in the current frame is in a moving state or stop state. The move/stop determining unit 1006 then outputs the determination result for the coordinates of each person to the output unit 1007. The output unit 1007 generates a visualized image based on the information received from the move/stop determining unit 1006, and outputs the image to the display device 130.

The above-described arrangement and operation will be described below in more detail.

Figure 2A:
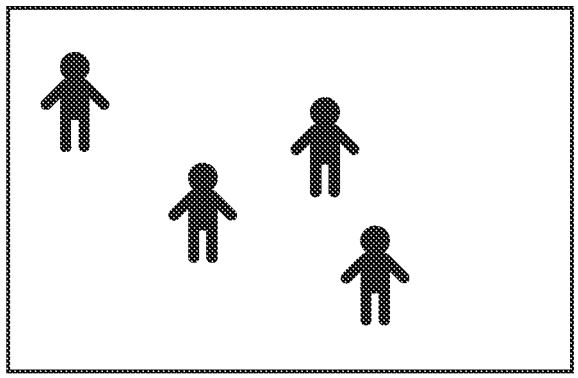
FIGS. 2A to 2F are views for explaining the coordinate information of persons.
Figure 2B:
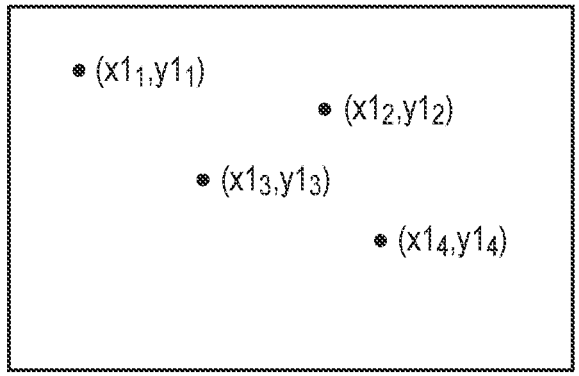

FIGS. 2A to 2F are views for explaining the coordinate information of persons. FIG. 2A shows a frame image of video data received from the image capturing device 200, and shows that four persons are captured. FIG. 2B shows the coordinates $(xf_p, yf_p)$ of the persons in the frame image shown in FIG. 2A. Here, "f" is a frame, and "p" is an identification number assigned to each captured person for the sake of convenience.

The person detection unit 1002 analyzes an image with captured persons as shown in FIG. 2A, and calculates the coordinate information of the persons as shown in FIG. 2B. Any generally known technique can be applied to the analysis. For example, a predetermined pattern recognized as a person in an image is detected, and the characteristics of peripheral pixels are analyzed, thereby specifying the shape of a boundary surrounding the detected person and defining (the center of) the head as the coordinates of the person. Alternatively, data obtained by learning many person images and a plurality of feature amounts obtained from the image are compared, thereby calculating a position in the image where the probability of existence of a person is high and defining a representative position in a region of a predetermined probability or more as the coordinates of the person. In some cases, to decrease the calculation amount, the center position of the circumscribing rectangle of the person may be defined as the coordinates of the person.

The processing of calculating the coordinates of a person is executed by the CPU 101 after the video analyzing apparatus 100 that is a PC receives a video transmitted from the image capturing device 200 that is a network camera or the like or recording data accumulated in the storage device 400. The calculated coordinate information of the person is stored in the HDD 104 in association with a frame. This processing may be executed not by the video analyzing apparatus 100 but by a CPU (not shown) incorporated in the image capturing device 200. In this case, the calculated coordinate information of the person is stored in a storage device (not shown) incorporated in the image capturing device 200 or in the storage device 400 on the network.

Figure 2C:
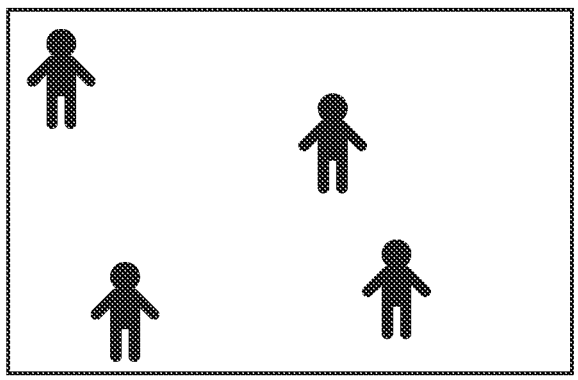
Figure 2D:
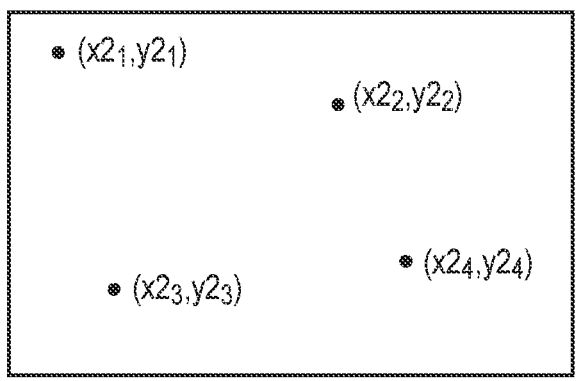

FIG. 2C shows a frame image at a time after FIG. 2A. FIG. 2C shows a state in which the positions of the four captured persons have changed because the time has elapsed. FIG. 2D shows the coordinate information of the persons in FIG. 2C. Note that in this case as well, "p" in the person coordinates (xfp, yfp) is an identification number assigned to each captured person for the sake of convenience. In FIGS. 2B and 2D, the same person need not always be assigned the same number.

Figure 2E:
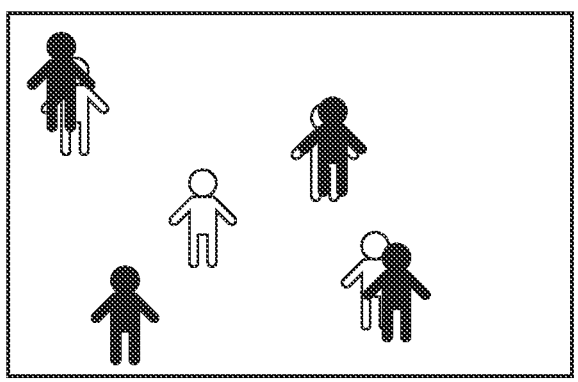
Figure 2F:
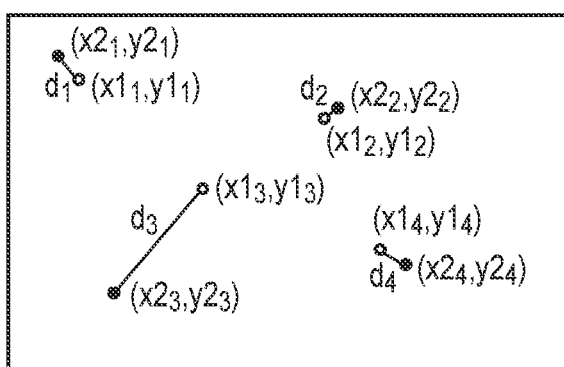

FIG. 2E is a view showing a state in which the frame images in FIGS. 2A and 2C are overlaid for a description to be made later. Black indicates persons captured in the frame image in FIG. 2C, and white indicates persons captured in the frame image in FIG. 2A. FIG. 2F shows the coordinate information of the persons corresponding to FIG. 2E.

FIGS. 2A and 2C show two frames of different times for the descriptive convenience. In fact, the coordinate information of each person is calculated for each frame of recording data or a video captured by the network camera.

Figure 3:
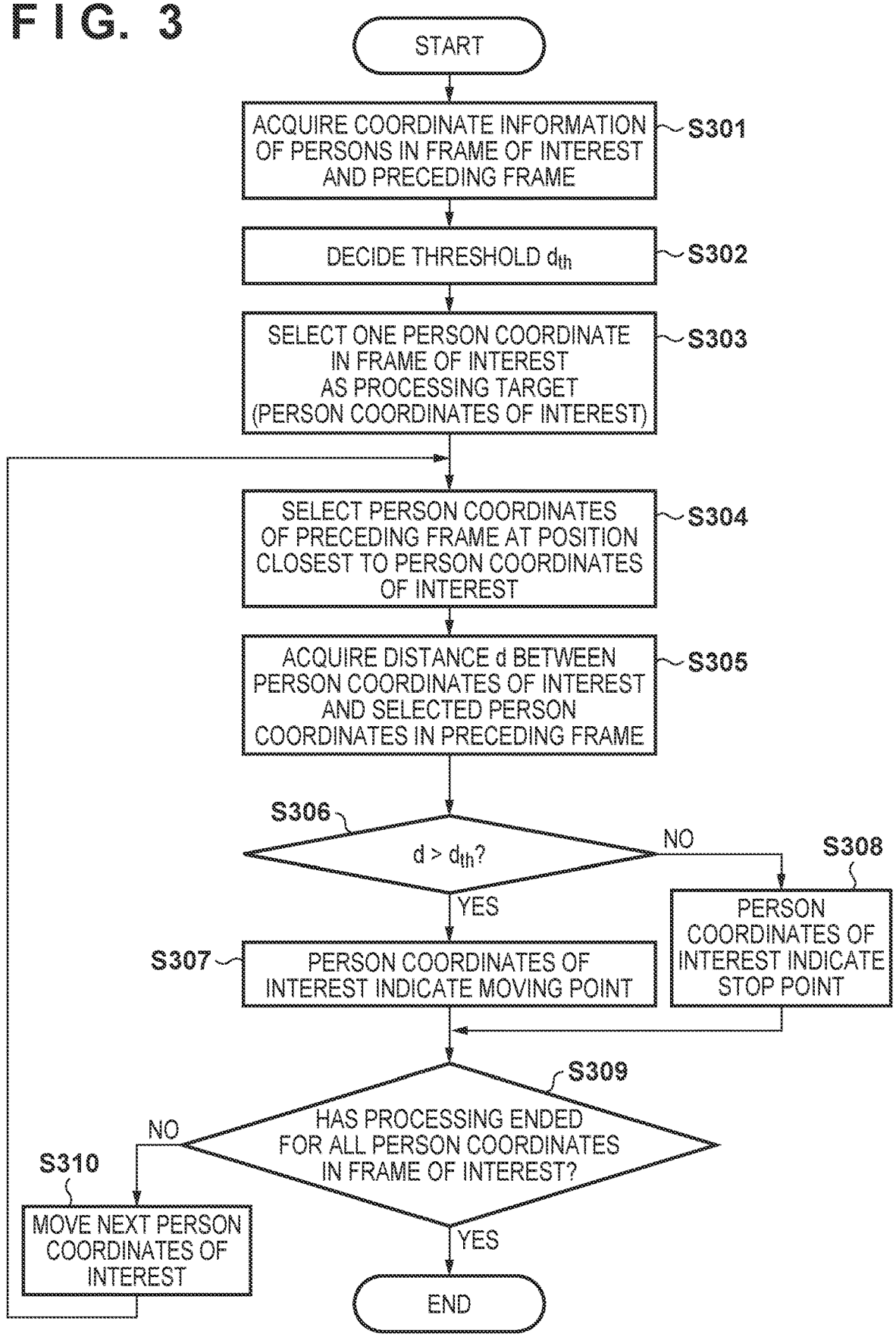
FIG. 3 is a flowchart showing the procedure of processing according to the first embodiment.

The procedure of processing of deciding movement or stop of a person by the move/stop determining unit 1006, which is executed by the CPU 101, will mainly be described next with reference to FIGS. 2A to 2F and 3. FIG. 3 is a flowchart of processing of deciding movement or stop of a person in a frame of a processing target based on the coordinate information of the person in the frame of the processing target and a frame as a comparison target at an immediately preceding time or before. Hence, it should be understood that the processing shown in FIG. 3 is executed every time a frame image is input.

In step S301, the CPU 101 (move/stop determining unit 1006) acquires the coordinate information of persons in two frames stored in the HDD 104. The frame as the processing target will be referred to as a "frame of interest", and a frame as a comparison target at a preceding time will be referred to as a "preceding frame" here. Normally, the preceding frame and the frame of interest are frames temporally adjacent to each other, and the time interval between them depends on the frame rate of a video from the network camera or an acquired recorded video. FIG. 2C corresponds to the frame of interest, and FIG. 2A corresponds to the preceding frame.

From then on, the CPU 101 performs processing for the coordinates of each person in the frame of interest.

In step S302, the CPU 101 (the congestion-degree estimating unit 1004 and the threshold deciding unit 1005) decides a threshold $d_{th}$ for move/stop determination of a person in the frame of interest. Details of the decision processing of the threshold $d_{th}$ will be described later.

In step S303, the CPU 101 (move/stop determining unit 1006) selects person coordinates as the first processing target from the person coordinates in the frame of interest. The person coordinates as the processing target will be referred to as "person coordinates of interest" hereinafter.

In step S304, the CPU 101 (move/stop determining unit 1006) selects person coordinates at a position closest to the person coordinates of interest from the person coordinates in the preceding frame. For example, if the person coordinates of interest are $(x2_1, y2_1)$ in FIG. 2F, person coordinates in the preceding frame, which are selected in step S304, are $(x1_1, y1_1)$. There is no guarantee that the thus selected person coordinates indicate the same person as the person corresponding to the person coordinates of interest. However, to observe the movement or stop state of a person from a broader viewpoint, a simple selection method with a small calculation amount is employed.

In step S305, the CPU 101 (move/stop determining unit 1006) calculates a distance d between the person coordinates of interest and the person coordinates in the preceding frame selected in step S304. For example, the distance d between the person coordinates $(x2_1, y2_1)$ of interest and the selected person coordinates $(x1_1, y1_1)$ is obtained by $$d = \sqrt{(x2_1-x1_1)^2+(y2_1-y1_1)^2} \quad (1)$$

The calculated distance d is regarded as a person moving distance between the frames.

In step S306, the CPU 101 (move/stop determining unit 1006) compares the distance d calculated in step S305 with the threshold $d_{th}$ obtained in step S302, thereby determining the magnitude of the distance d. Upon determining that the distance d is larger than the threshold $d_{th}$, the CPU 101 advances the process to step S307. Otherwise (if the distance d is equal to or smaller than the threshold $d_{th}$), the CPU 101 advances the process to step S308.

In step S307, the CPU 101 (move/stop determining unit 1006) determines that the person coordinates of interest indicate a moving point (or a moving state), and outputs the determination result and the coordinates of the person to the output unit 1007 in association with each other. Additionally, in step S308, the CPU 101 determines that the person coordinates of interest indicate a stop point (or a non-moving state), and outputs the determination result and the coordinates of the person to the output unit 1007 in association with each other.

In step S309, the CPU 101 (move/stop determining unit 1006) determines whether the determination processing has been executed for all person coordinates of interest in the frame of interest. If the determination processing has ended, the processing for the frame of interest is ended. If unprocessed person coordinates of interest remain, the CPU 101 advances the process to step S310.

In step S310, the CPU 101 (move/stop determining unit 1006) sets any of unprocessed person coordinates in the frame of interest to the next person coordinates of interest, and returns the process to step S304.

The above-described processing is executed for all person coordinates in the frame of interest, thereby deciding whether the coordinates of each person correspond to a moving point or stop point.

The decision processing of the threshold $d_{th}$ in step S302 will be described here. As is apparent from the above description, the threshold $d_{th}$ can be considered to be a boundary value used to determine that coordinates indicate movement if the person moving distance d between frames exceeds the value, and that coordinates indicate stop if the person moving distance d is equal to or less than the value.

In this embodiment, the boundary value representing whether a person is moving or stopping is defined based on a moving speed v (meters/sec) (to be referred to as (m/s) hereinafter) of a person in an actual space. Basic elements necessary when reflecting this on video analysis are (i) a frame rate (the number of frames per sec: to be referred to as fps hereinafter) or a time interval to execute analysis, and (ii) the scale of an image (the relationship between an actual size and the number of pixels on an image).

For example, when the frame rate is f (fps), and the target is set to an image in which, concerning the scale, a 1-meter long actual object is represented by w pixels on the image, if a person captured there moves at the speed v (m/s), the coordinate change between the preceding and subsequent frames is (w × v)/f (pixels).

Similarly, letting $v_{th}$ be the moving speed used as a threshold to determine movement or stop in the actual space, the moving amount corresponding to that on the image is (w×$v_{th}$)/f (pixels). Note that since the walking speed of a general adult is known to be about 1 (m/s), the moving speed with serving as a threshold is normally set to 1 (m/s).

If the congestion degree around a walking person is high, the walkable speed changes. Hence, when the moving speed $v_{th}$ serving as a threshold is corrected in accordance with that, the move/stop determination accuracy can be increased. It is known that the congestion degree (defined as c) that is the number of persons existing per unit area and the walkable speed (defined as v) have a reverse proportional relationship. Hence, the speed v can be defined by v=α×c+β, and this is applied to the threshold $v_{th}$. Note that α and β are preset coefficients, which may be set by the user.

From the above description, the threshold $d_{th}$ can be defined by $$d_{th} = \frac{1}{f} \times w \times v_{th} \quad (2)$$

where $v_{th}$=α×c+β

FIG. 4 is a graph showing the threshold $d_{th}$ decided in accordance with the frame rate f (fps) and the congestion degree c. (persons/m²) when the value w representing a scale is fixed to a certain value.

The congestion-degree estimating unit 1004 calculates the congestion degree c. from the person coordinate distribution (simply, the number of coordinates of persons) in the frame of interest. Alternatively, the congestion-degree estimating unit 1004 may decide the congestion degree c. by looking up a table (held in the HDD 104) representing the correspondence between the number of persons and the congestion degree (Cx: x=1, 2 ...) as shown in FIG. 11. When the table is appropriately corrected in accordance with the environment of image capturing, it is possible to cope with various situations only by rewriting the table, as a matter of course. The method of obtaining the threshold $d_{th}$ in the embodiment has been described above.

The threshold deciding unit 1005 applies the congestion degree c. and the frame f to equation (2) described above, thereby calculating (deciding) the threshold $d_{th}$.

Display output of a movement or stop determination result obtained by analysis by the output unit 1007 according to this embodiment will be described next.

Figure 5A:
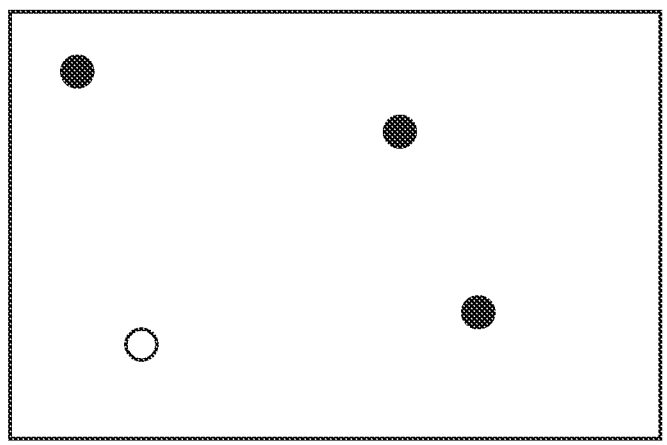
FIGS. 5A and 5B are views showing display examples in the first embodiment.

Referring to FIG. 2F, assume that only a moving distance d3 exceeds the threshold $d_{th}$ in moving distances d1 to d4 of the four captured persons between the frames. That is, the moving point is $(x2_3, y2_3)$, and the stop points are $(x2_1, y2_1)$, $(x2_2, y2_2)$, and $(x2_4, y2_4)$. FIG. 5A shows an example of a drawing made while discriminating the moving point and the stop points based on the result. In this example, the moving point is drawn by an open circle symbol, and each stop point is drawn by a full circle symbol.

Note that although the moving point is drawn by an open circle symbol, and each stop point is drawn by a full circle symbol here, the drawing method is not limited to this. Since visually identifying the moving point and the stop points suffices, the difference can be expressed by one of the color, shape, and size, or a combination of some of them.

Figure 5B:
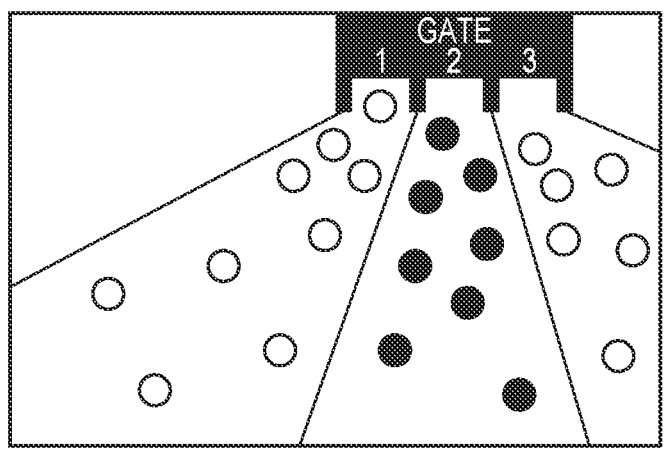

FIG. 5B shows another display example of the analysis result. An example in which columns of persons waiting for entry are formed on three lanes, and only the lane at the center stops is shown here. When movement or stop of persons is determined and discriminately drawn in this way, an expression method that makes it easy to visually grasp the distribution or flow of persons can be provided.

Note that the image shown in FIG. 5A or 5B in which the symbols are arranged may be superimposed on an actual captured image.

As described above, using the threshold that decides the moving distance of the person between different frames in accordance with the frame rate and the congestion degree, it can be determined how a person captured in a video is moving or stopping. Furthermore, when the determination result is drawn while discriminating the moving point and the stop points, how a person is stopping or moving in a video can be provided as an expression for making it easy to grasp.

Note that in the above-described embodiment, the difference d between the coordinates of a person in the frame of interest and the coordinates of the person in the preceding frame a time 1/f before the frame of interest is compared with the threshold $d_{th}$, thereby determining the movement or stop. That is, the relationship between the preceding frame and the frame of interest is represented by the frame rate f. However, the time between the frame of interest and the preceding frame may be used in place of 1/f of equation (2). For example, if the image capturing device 200 is capturing an image at a frame rate of 10 frames/sec, a setting may be done to set a frame two frames before the "frame of interest" as the "preceding frame". In this case, the "preceding frame" is a frame ⅕ sec before the "frame of interest". Hence, more clearly, letting Δt be the time difference between the "preceding frame" and the "frame of interest", the threshold $d_{th}$ may be decided not by equation (2) but by $$d_{th} = \Delta t \times w \times v_{th} \quad (3)$$

where w and $v_{th}$ have the same meanings as equation (2).

Second Embodiment

In the above-described first embodiment, the moving speed of a person is calculated from the person moving distance between frames, and movement or stop is determined using a threshold derived in accordance with a congestion degree. If the distance exceeds the threshold, it is determined that the person is moving. However, a case can also be assumed in which the moving speed corresponding to the calculated person moving distance is abnormally high. In the second embodiment, an example in which an abnormal value is provided when a walking person is a target will be described.

The walking speed of a general adult is assumed to be about 1 (m/s) in a case in which the congestion degree is low, and a factor that impedes walking is not present. Since a human runs 100 m in about 10 sec (10 m/sec) at most, there is no person who can walk at a speed 20 times higher than the speed. If the person moving distance between frames is a numerical value corresponding to 20 times of the normal walking speed, it can be obviously determined as an abnormal value.

FIG. 6 is a graph showing an upper limit value $d_a$ used to judge a threshold $d_{th}$ according to a frame rate f as an abnormal value when a value w of scale and a congestion degree c. are fixed to certain values. If the calculated person moving distance between frames exists in a region A in FIG. 6, the person is determined to be stopping. If the person moving distance exists in a region B, the person is determined to be moving. If the person moving distance exists in a region C, it is determined as an abnormal value.

Figure 7:
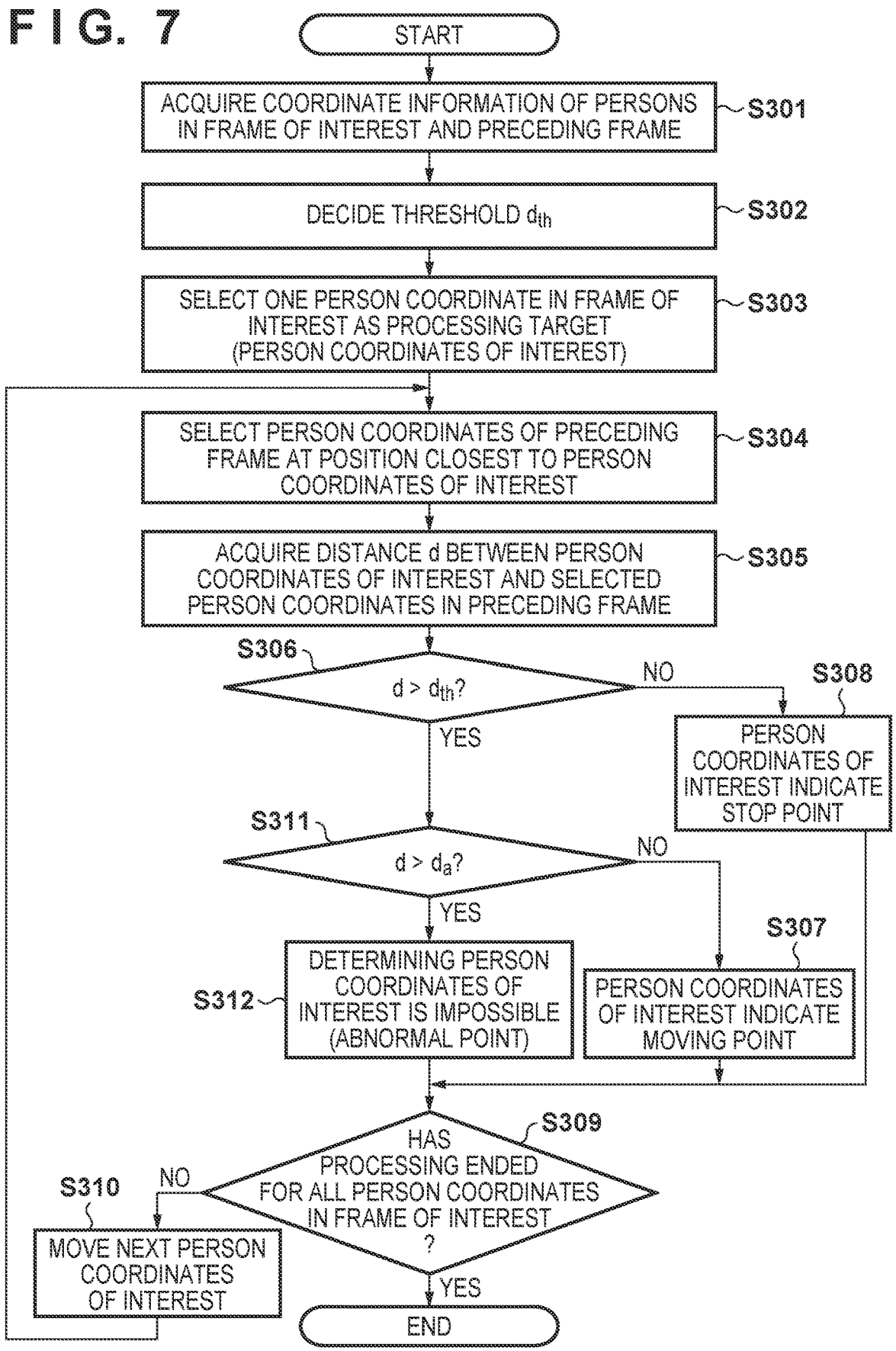
FIG. 7 is a flowchart showing the procedure of processing according to the second embodiment.

FIG. 7 is a flowchart of determination processing of move/stop of a person in a target frame in a case in which the threshold defined as shown in FIG. 6 is applied. The same step numbers denote processes common to the flowchart of FIG. 3, and a description thereof will be omitted.

If a CPU 101 judges in step S306 that a distance d is larger than the threshold $d_{th}$, the process advances to step S311. In step S311, the CPU 101 determines the magnitude of the distance d with respect to the threshold $d_a$. Upon determining that the distance d is equal to or less than the threshold $d_a$, the CPU 101 advances the process to step S307. In step S307, the CPU 101 determines the person coordinates of interest indicates a moving point. On the other hand, upon determining that the distance d is more than the threshold $d_a$, the CPU 101 advances the process to step S312. In step S312, the CPU 101 decides that the person coordinates of interest indicates an abnormal point that is moving abnormally fast, and the determination is impossible.

With the above-described processing, not only movement or stop of a person but also abnormality can be detected. Hence, for example, if a person in a vehicle is captured in a video in which a pedestrian is being analyzed as a target, a result of excluding that can be obtained.

In addition, an image in which a symbol that allows a user to identify stop, movement, or abnormality is arranged at the position of each person may be generated and displayed.

Third Embodiment

In the above-described first and second embodiments, the value w of scale is fixed to a predetermined value. However, depending on the installation condition of the image capturing device 200, the size of a captured person largely changes by the place even in one screen, as shown in FIG.

8A. In the third embodiment, processing of changing a value w of scale in a screen and determining movement and stop of a person will be described.

When person detection processing is used to acquire person coordinates in an image, person size information can be acquired. For example, the number of pixels corresponding to a shoulder width is defined as a person size from a person shape obtained at the time of person detection. Using this information, a threshold for each detected person is calculated and applied, thereby coping with a person size change in an image. Assuming that the number of pixels corresponding to the shoulder width of a person is wp, and the general shoulder width of an adult is 0.4 m, a threshold $dp_{th}$ for each person can be represented by $$dp_{th} = \frac{1}{f} \times \frac{wp}{0.4} \times v_{th} \quad (4)$$

On the other hand, if a method of calculating a position where a person exists at a high probability is used as the processing of acquiring person coordinates in an image, it is difficult to acquire the person size of each individual. In this case, simple person detection processing is executed in advance to roughly acquire the distribution of person sizes in an image, the region is divided into a plurality of regions, as shown in FIG. 8B, and wp is defined for each region. Alternatively, region division and wp setting may be manually performed.

This enables threshold setting suitable for determination of movement and stop of a person in a case in which the sizes of captured persons are different in one screen.

Figure 12:
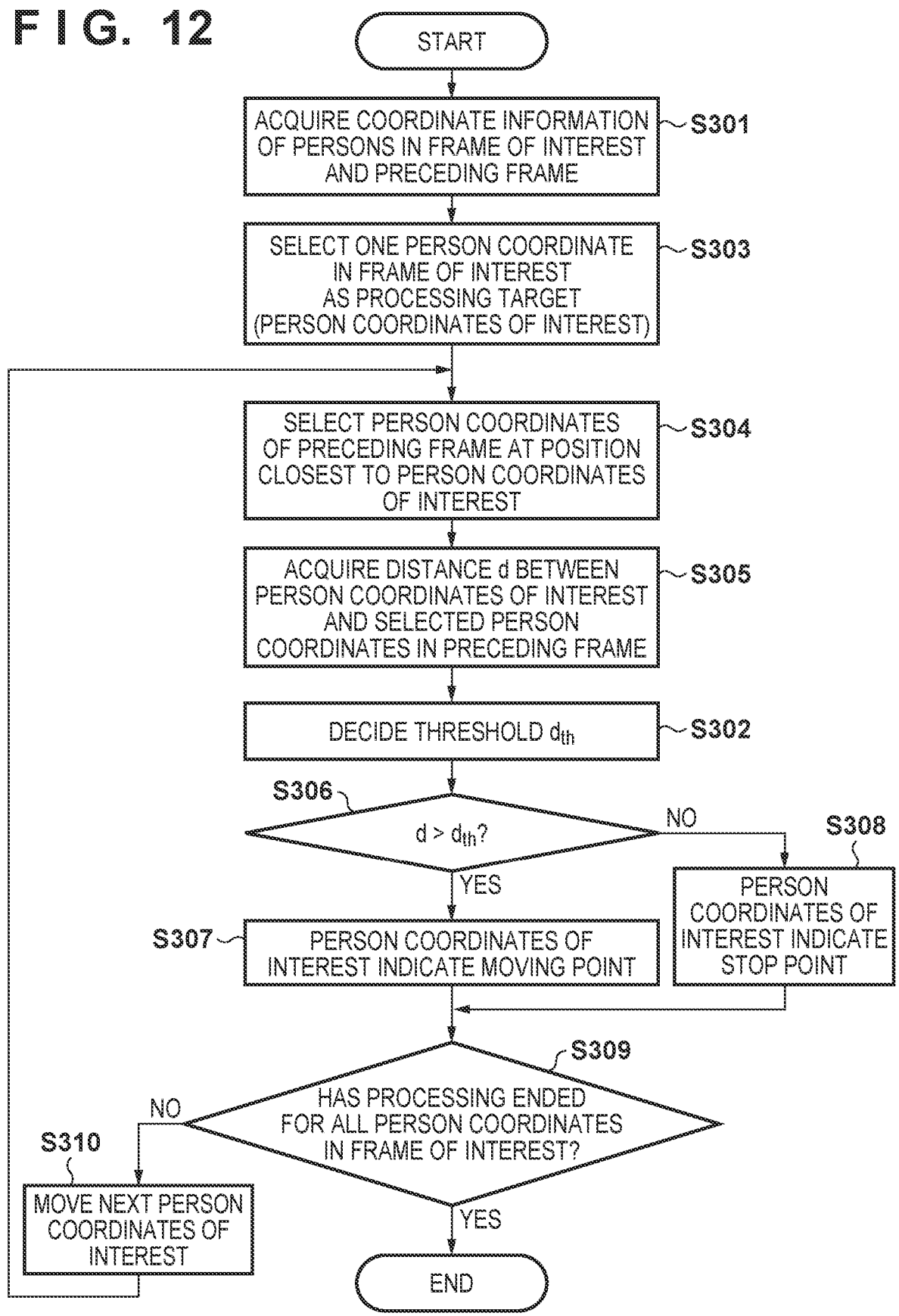
FIG. 12 is a flowchart showing the procedure of processing according to the third embodiment.

FIG. 12 is a flowchart showing the procedure of processing of deciding movement or stop of a person in the third embodiment.

FIG. 12 and FIG. 3 are different in the position of step S302 of processing of deciding a threshold $d_{th}$. Threshold determination is performed in step S302 of FIG. 12 because the threshold $d_{th}$ of move/stop determination is decided depending on which one of regions w1 to s5 in FIG. 8B is a region to which person coordinates of interest in a frame of interest belong. The rest is the same as in the first embodiment, and a description thereof will be omitted.

Fourth Embodiment

In the first to third embodiments, the description has been made assuming that the congestion degree c. is constant in one screen. However, in a captured image of a place where waiting lines are divided on a destination basis, areas of different congestion degrees may exist in one screen, as shown in FIG. 9A. In FIG. 9A, many persons exist on the left lane of two lanes, and the right lane is not crowded. In this case, the area is divided in the image, as shown in FIG. 9B, and a congestion degree appropriate for each situation is set. In this case, for a congestion degree cl on the left side that is crowded, a value larger than a congestion degree cr on the right side that is not crowded is set. The congestion degrees are manually set while viewing the video of the analysis target. Alternatively, an appropriate congestion degree may be calculated for each area based on the person coordinate distribution and set. Note that to implement the fourth embodiment, an image region to be captured by an image capturing device 200 is divided into two regions in advance, and setting is done to calculate the congestion degree of each region independently.

The embodiments have been described above. According to this embodiments, to determine the movement or stop of a person, a threshold decided by the difference of coordinate information of a person between two images of different times, and one of the analysis time interval, the size of a captured person, and the congestion degree is used, thereby improving the determination accuracy. In this method, the camera settings at the time of image capturing need not be changed in accordance with analysis. In addition, it is not necessary to acquire a background image or generate a difference image for analysis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc® (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107453, filed Jun. 7, 2019, which is hereby incorporated by reference herein in its entirety.

What is claimed is:

1. A video analyzing apparatus comprising:
a processor; and
a memory storing executable instructions which, when executed by the processor, cause the video analyzing apparatus to perform operations including:
acquiring a first image and a second image captured after the first image has been captured by an image capturing apparatus;
determining a degree of congestion of persons in the second image;
calculating a distance from a position of a person included in the first image to a position of the person included in the second image; and deciding a threshold to be used to determine a moving state of the person in the second image based on the degree of congestion, wherein the threshold contains a first threshold and a second threshold, where the first threshold and the second threshold are decided by the degree of congestion and a framerate of the image capturing apparatus, and wherein, in a case the distance is larger than the second threshold, the moving state is determined to be abnormal, in a case the distance is equal to or less than the second threshold and larger than the first threshold, the moving state is determined to be moving, and in a case the distance is less than the first threshold, the moving state is determined to be stopping.

2. The video analyzing apparatus according to claim 1, wherein the executable instructions cause the video analyzing apparatus to perform the operations further including:

outputting information representing the determined moving state of the person.

3. The video analyzing apparatus according to claim 1, wherein the degree of congestion in the second image is determined based on a number of persons included in the second image.

4. The video analyzing apparatus according to claim 2, wherein the information is displayed in a display apparatus to display an image in which for each person in the second image, a symbol representing the moving state of the person is arranged at a position of the person.

5. The video analyzing apparatus according to claim 4, wherein the symbol in a first display form is arranged at a position of a person of the persons in the image, for which the distance is not less than the threshold, and a symbol in a second display form different from the first display form is arranged at a position of a person for which the distance is less than the threshold.

6. The video analyzing apparatus according to claim 1, wherein for each of a plurality of regions set in advance in the image, the threshold in the region is decided based on the degree of congestion in the region.

7. The video analyzing apparatus according to claim 1, wherein the threshold is determined depending on a position of a region containing the person included in the second image.

8. A method of controlling a video analyzing apparatus, the method comprising:

acquiring a first image and a second image captured after the first image has been captured by an image capturing apparatus;

determining a degree of congestion of persons in the second image;

calculating a distance from a position of a person in the first image to a position of the person in the second image; and deciding a threshold to be used to determine a moving state of the person in the second image based on the degree of congestion, wherein the threshold contains a first threshold and a second threshold, where the first threshold and the second threshold are decided by the degree of congestion and a framerate of the image capturing apparatus, and wherein, in a case the distance is larger than the second threshold, the moving state is determined to be abnormal, in a case the distance is equal to or less than the second threshold and larger than the first threshold, the moving state is determined to be moving, and in a case the distance is less than the first threshold, the moving state is determined to be stopping.

9. A non-transitory computer-readable storage medium storing a program which, when read and executed by a computer, causes the computer to execute the steps of a method of controlling a video analyzing apparatus, the method comprising:

acquiring a first image and a second image captured after the first image has been captured by an image capturing apparatus;

determining a degree of congestion of persons in the second image;

calculating a distance from a position of a person in the first image to a position of the person in the second image; and deciding a threshold to be used to determine a moving state of the person in the second image based on the degree of congestion, wherein the threshold contains a first threshold and a second threshold, where the first threshold and the second threshold are decided by the degree of congestion and a framerate of the image capturing apparatus, and wherein, in a case the distance is larger than the second threshold, the moving state is determined to be abnormal, in a case the distance is equal to or less than the second threshold and larger than the first threshold, the moving state is determined to be moving, and in a case the distance is less than the first threshold, the moving state is determined to be stopping.

* * * * *